United States Patent
Bonafini, Jr.

(10) Patent No.: US 10,633,472 B2
(45) Date of Patent: Apr. 28, 2020

(54) ULTRA-HIGH DK MATERIAL

(71) Applicant: Acuity Polymers, Inc., Rochester, NY (US)

(72) Inventor: James A. Bonafini, Jr., Kendall, NY (US)

(73) Assignee: Acuity Polymers, Inc., Rochester, NY (US)

( * ) Notice: Subject to any disclaimer, the term of this patent is extended or adjusted under 35 U.S.C. 154(b) by 16 days.

(21) Appl. No.: 16/022,114

(22) Filed: Jun. 28, 2018

(65) Prior Publication Data

US 2020/0002452 A1     Jan. 2, 2020

(51) Int. Cl.
*C08F 220/24*     (2006.01)
*B29K 33/00*     (2006.01)
*B29D 11/00*     (2006.01)

(52) U.S. Cl.
CPC ...... *C08F 220/24* (2013.01); *B29D 11/00038* (2013.01); *B29K 2033/08* (2013.01); *B29K 2995/0065* (2013.01); *C08F 2800/20* (2013.01)

(58) Field of Classification Search
CPC .............................. C08F 220/24; C08F 230/08
USPC .......................................................... 526/279
See application file for complete search history.

(56) References Cited

U.S. PATENT DOCUMENTS

| | | | |
|---|---|---|---|
| 4,405,773 A | 9/1983 | Loshaek et al. | |
| 5,162,469 A * | 11/1992 | Chen ................... | C08F 214/186 351/159.33 |
| 7,828,432 B2 | 11/2010 | Meyers et al. | |
| 2012/0277342 A1 | 11/2012 | McGee et al. | |
| 2014/0362339 A1 | 12/2014 | Imafuku | |
| 2017/0146823 A1 | 5/2017 | Lee et al. | |

* cited by examiner

*Primary Examiner* — Margaret G Moore
(74) *Attorney, Agent, or Firm* — Woods Oviatt Gilman LLP; Katherine H. McGuire, Esq.; Douglas R. Smith, Esq.

(57) ABSTRACT

A method of producing an ultra-high Dk material includes contacting and reacting a fluoroalkyl methacrylate; an alkyl glycol dimethacrylate; a hydrophilic agent, such as methacrylic acid; a hydroxyalkyl tris(trimethylsiloxy)silane; a hydroxyalkyl terminated polydimethylsiloxane; and styrylethyltris(trimethylsiloxy)silane. The reaction is conducted within an inert atmosphere at a pressure of at least 25 pounds per square inch (PSI) and for a period of time and at a temperature sufficient to produce the ultra-high Dk material.

14 Claims, No Drawings

ULTRA-HIGH DK MATERIAL

TECHNICAL FIELD

The present invention relates to ultra-high gas permeable (Dk) materials and methods of the same; and more particularly to ultra-high Dk materials having Dk values greater than 175; and still more particularly to ultra-high Dk suitable for use as rigid gas permeable contact lenses.

BACKGROUND OF THE INVENTION

Initially, rigid contact lenses were constructed of poly (methyl methacrylate) and were impermeable to oxygen. As a result, wearers of such lenses would quickly complain of eye fatigue and eye strain due to a lack of oxygen to the cornea. Thus, contact lens science advanced to silicone-based contact lenses, including rigid gas permeable (RGP) contact lenses. While RGP contact lenses do afford some degree of oxygen permeability (Dk values of 30-70, with some up to 140-145), wearers continue to cite eye fatigue and eye strain as the day progresses. While wear times have increased, fatigue and strain remain issues as a result of a lack of oxygen to the cornea. Thus, what is needed is a material suitable for use as a RGP lens which exhibits ultra-high oxygen permeability (Dk value greater than 175).

Oxygen for aerobic corneal metabolism is derived principally from the atmosphere. Therefore, the physiologic integrity of the cornea during wear of a gas-permeable soft or rigid contact lens is thought to be primarily dependent on the consumption of oxygen that passes through the lens. Prediction of the physiologic performance of a contact lens on the eye, therefore, requires an index that allows the oxygen passage through the lens to be estimated.

In 1971, Fatt and St. Helen applied Fick's Law to the problem of oxygen passage through contact lenses, thereby bringing to the field the concept of oxygen transmissibility (Dk/t). This bench-top measurement has been used extensively as a basis for comparison of contact lenses. However, as Fatt has pointed out, the Dk/t term used by itself as a measure of lens performance has been "a disappointment." The Dk/t coefficient gives a measure of the "ease" with which oxygen can diffuse through a lens; however, oxygen passage through a contact lens in a given scenario is also dependent on the driving force—that is, the partial pressure difference—across the lens. Oxygen flux (j) is the true index of the amount of oxygen that passes through a unit area of lens in a given time.

SUMMARY OF THE INVENTION

In accordance with an aspect of the present invention, a method of producing an ultra-high Dk material comprises contacting and reacting: a fluoroalkyl methacrylate; an alkyl glycol dimethacrylate; a hydrophilic agent, such as methacrylic acid; a methacryl functional tris(trimethylsiloxy) silane; a methacryl functional terminated polydimethylsiloxane; and styrylethyltris(trimethylsiloxy)silane. The reaction is conducted within an inert atmosphere at a pressure of at least 25 pounds per square inch (PSI) for a period of time and at a temperature sufficient to produce the ultra-high Dk material. By way of example, the fluoroalkly methacrylate may be hexafluoroisopropyl methacrylate; the alkyl glycol dimethacrylate may be neopentyl glycol dimethacrylate; the methacryl functional tris(trimethylsiloxy)silane may be 3-methacryloyloxypropyl tris(trimethylsiloxy) silane; and the methacryl functional terminated polydimethylsiloxane may be 4-methacryloxybutyl terminated polydimethylsiloxane. The styrylethyltris(trimethylsiloxy)silane may comprise 14% of the material, by weight. The resultant material has a Dk value greater than 175.

In accordance with an aspect of the present invention, the reaction is conducted under a nitrogen, argon or helium atmosphere and is conducted between 25 psi and 1,000 psi (pounds per square inch). The reaction may be conducted within a thermostatically-controlled oven. Reaction temperate may be at room temperature (20° C.-25° C.) or at an elevated temperature, such as up to about 50° C. The oven may also be programmable to allow for variable temperature control over the course of the reaction. The reaction is further conducted within a vessel wherein the ultra-high Dk material is formed in the shape of the vessel. In one aspect, the high Dk material is formed as a blank or rod. The vessel may be constructed of a vessel material that is permeable to the inert gas comprising the inert atmosphere, such as polypropylene or polytetrafluoroethylene.

DETAILED DESCRIPTION

Polymerization of suitable monomeric reagents under high pressure may produce polymeric materials with an increase in oxygen permeability over reactions conducted at ambient pressure. When using starting monomers having high oxygen affinities, the increase in oxygen permeability may be even more pronounced. As a result, materials having ultra-high Dk values may be produced. As used herein, the term "ultra-high Dk" refers to materials having a Dk value greater than 175. To that end, polymerization reactions in accordance with the present invention are conducted under high pressure (at least 25 psi) within a thermostatically-controlled oven at room temperature. "Room temperature" may be anywhere between 20° C. and 25° C. In accordance with a further aspect of the present invention, the polymerization reactions may be conducted at pressures higher than 25 psi, including up to about 1000 psi and/or higher temperatures, such as up to about 50° C. Higher oxygen permeabilities may be realized as the reaction pressure increases. Moreover, the polymerization reactions should be conducted in an inert atmosphere, such as, and without limitation thereto, a nitrogen, helium and/or argon atmosphere. Without being tied to any particular theory, it is believed that the ultra-high Dk polymer materials are formed as a xerogel or xerogel-like material. It is further believed that the inert gas acts like a solvent and once the polymer network is formed, the inert gas is replaced by ambient gases thereby forming a microporous structure. In a further aspect of the invention, the ultra-high Dk polymer materials may be produced under super critical fluid conditions. It is thus believe that the rigidity of the polymer network acquired through use of specific monomers and crosslinkers prevents collapse of the microporous structure.

In accordance with an aspect of the present invention, a non-limiting exemplary ultra-high Dk formulation is shown in Table 1:

TABLE 1

| Component | Weight % | CAS Number |
|---|---|---|
| Hexafluoroisopropyl methacrylate | 42.0 | 3063-94-3 |
| Neopentyl glycol dimethacrylate | 7.0 | 1985-51-9 |
| Methacrylic acid | 7.0 | 79-41-4 |
| 3-Methacryloyloxypropyl tris(trimethylsiloxy)silane | 19.0 | 17096-07-0 |

TABLE 1-continued

| Component | Weight % | CAS Number |
|---|---|---|
| 4-methacryloxybutyl terminated polydimethylsiloxane | 11.0 | 58130-03-3 |
| styrylethyltris(trimethylsiloxy)silane | 14.0 | NA |
| TOTAL | 100.0 | |

It should be noted that the weight percentage of styrylethyltris(trimethylsiloxy)silane (7%-20%, and more particularly, 14%) combined with the polymerization under high pressure (at least 25 psi) is critical to the production of the ultra-high Dk material. It is believed that the styrylethyltris(trimethylsiloxy)silane helps create a high free-volume structure and is synergistic with the 3-methacryloyloxypropyl tris(trimethylsiloxy)silane.

In accordance with a further aspect of the present invention, a method of producing an ultra-high Dk material comprises contacting and reacting: a fluoroalkyl methacrylate; an alkyl glycol dimethacrylate; a hydrophilic agent, such as methacrylic acid; a methacryl functional tris(trimethylsiloxy)silane; a methacryl functional terminated polydimethylsiloxane; and styrylethyltris(trimethylsiloxy)silane. By way of example and without limitation thereto, the fluoroalkly methacrylate may be hexafluoroisopropyl methacrylate; the alkyl glycol dimethacrylate may be neopentyl glycol dimethacrylate; the methacryl functional tris(trimethylsiloxy)silane may be 3-methacryloyloxypropyl tris(trimethylsiloxy)silane; and the methacryl functional terminated polydimethylsiloxane may be 4-methacryloxybutyl terminated polydimethylsiloxane. The reaction is conducted within an inert atmosphere (e.g., nitrogen, argon or helium) at a pressure of at least 25 psi for a period of time and at a temperature sufficient to produce the ultra-high Dk material. As discussed above, the reaction may be conducted at room temperature, e.g., between about 20° C. and about 25° C., or at an elevated temperature, such as up to about 50° C., and under pressures between about 25 psi and about 1,000 psi. As a result, the ultra-high Dk material may have a Dk value greater than 175, with reactions conducted at higher pressures yielding materials with higher Dk values. Additionally, an ultra-high Dk material in accordance with the present invention may have relatively low silicon content, and thereby avoid surface wetting problems encountered with high silicon gas permeable materials. As a result, the ultra-high Dk materials produced in accordance with the present invention do not require surface treatments, such as plasma treatments.

The polymerization reaction may be conducted within a vessel wherein the internal dimensions and geometry correspond to the desired size and shape of the ultra-high Dk material. That is, the ultra-high Dk material will polymerize within the vessel in the shape of the void of the vessel. The vessel may be constructed of a material, such as polypropylene or polytetrafluoroethylene (PTFE), that is permeable to the inert gas comprising the inert atmosphere. In accordance with an aspect of the invention, the vessel may reside with a thermostatically-controlled oven set at a specific temperature, such as between 20° C. and 50° C., or the oven may be programmable so as to permit reactions with variable temperature profiles.

By way of example, an ultra-high Dk material produced in accordance with an aspect of the present invention may be used to fabricate rigid gas permeable (RGP) contact lenses. In this non-limiting example, the high Dk material may be formed as a lens, blank or rod having a diameter between about 7 mm and 28 mm. The blanks may have heights between about 2 mm and about 15 mm while the rods may have any desired heights. The diameter of the rod or blank may be selected in accordance with its intended use. For instance, traditional RGP contact lenses have diameters between about 7 mm to about 12 mm (typically between 9 mm and 10 mm) while scleral lenses have larger diameters between about 14 mm to about 24 mm (typically between 15 mm and 20 mm). The ultra-high Dk material blanks and rods may then be shaped through a lathing process to produce the desired lens, as is known in the art. Alternately, lenses may be cast directly under the described conditions.

Although the invention has been described with reference to preferred embodiments thereof, it is understood that various modifications may be made thereto without departing from the full spirit and scope of the invention as defined by the claims which follow.

What is claimed is:

1. A method of producing an ultra-high Dk material which comprises contacting and reacting:
   a) a fluoroalkyl methacrylate;
   b) an alkyl glycol dimethacrylate;
   c) a hydrophilic agent;
   d) a methacryl functional tris(trimethylsiloxy)silane;
   e) a methacryl functional terminated polydimethylsiloxane; and
   f) styrylethyltris(trimethylsiloxy)silane, the reaction being conducted within an inert atmosphere at a pressure of at least 25 pounds per square inch (PSI) and for a period of time and at a temperature sufficient to produce the ultra-high Dk material.

2. The method of claim 1 wherein the fluoralkyl methacrylate is hexafluoroisopropyl methacrylate; the alkyl glycol dimethacrylate is neopentyl glycol dimethacrylate; the methacryl functional tris(trimethylsiloxy)silane is 3-methacryloyloxypropyl tris(trimethylsiloxy)silane; the methacryl functional terminated polydimethylsiloxane is 4-methacryloxybutyl terminated polydimethylsiloxane; the hydrophilic agent is methacrylic acid.

3. The method of claim 2 wherein the styrylethyltris(trimethylsiloxy)silane comprises 14% of the material, by weight.

4. The method of claim 1 wherein the styrylethyltris(trimethylsiloxy)silane comprises between 7% and 20% of the material, by weight.

5. The method of claim 4 wherein the styrylethyltris(trimethylsiloxy)silane comprises 14% of the material, by weight.

6. The method of claim 1 wherein the reaction is conducted under a nitrogen, argon or helium atmosphere.

7. The method of claim 1 wherein the reaction is conducted between 25 psi and 1,000 psi.

8. The method of claim 1 wherein the reaction is conducted within a vessel wherein the ultra-high Dk material is formed in the shape of the vessel.

9. The method of claim 8 wherein vessel is selected whereby the ultra-high Dk material is formed as a lens, blank or rod.

10. The method of claim 8 wherein the vessel is constructed of a vessel material that is permeable to the inert gas comprising the inert atmosphere.

11. The method of claim 10 wherein the vessel is constructed of polypropylene or polytetrafluoroethylene.

12. The method of claim 1 wherein the reaction is conducted at room temperature.

13. The method of claim 1 wherein the reaction is conducted above room temperature.

14. An ultra-high Dk material produced according to the method of claim 1.

* * * * *